(12) United States Patent
Prince et al.

(10) Patent No.: US 11,713,920 B2
(45) Date of Patent: Aug. 1, 2023

(54) PROCESS FOR CRYOGENIC SEPARATION OF A FEED STREAM CONTAINING METHANE AND AIR GASES, FACILITY FOR PRODUCING BIOMETHANE BY PURIFICATION OF BIOGASES DERIVED FROM NON-HAZARDOUS WASTE STORAGE FACILITIES (NHWSF) IMPLEMENTING THE PROCESS

(71) Applicant: WAGA ENERGY, Meylan (FR)

(72) Inventors: Guénaël Prince, Saint Egreve (FR); Nicolas Paget, Saint Martin D'heres (FR); Jean-Yves Lehman, Paris (FR)

(73) Assignee: WAGA ENERGY, Eybens (FR)

( * ) Notice: Subject to any disclaimer, the term of this patent is extended or adjusted under 35 U.S.C. 154(b) by 630 days.

(21) Appl. No.: 16/303,551

(22) PCT Filed: Mar. 20, 2017

(86) PCT No.: PCT/FR2017/050651
§ 371 (c)(1),
(2) Date: Nov. 20, 2018

(87) PCT Pub. No.: WO2017/203112
PCT Pub. Date: Nov. 30, 2017

(65) Prior Publication Data
US 2020/0318896 A1    Oct. 8, 2020

(30) Foreign Application Priority Data

May 27, 2016  (FR) ...................................... 1654798

(51) Int. Cl.
*F25J 3/02*    (2006.01)
(52) U.S. Cl.
CPC ........... *F25J 3/0233* (2013.01); *F25J 3/0209* (2013.01); *F25J 2200/02* (2013.01);
(Continued)

(58) Field of Classification Search
CPC ...... F25J 3/0257; F25J 3/0276; F25J 2200/02; F25J 2200/38; F25J 2200/70;
(Continued)

(56) References Cited

U.S. PATENT DOCUMENTS

| 2,519,955 A | 8/1950 | Deming |
| 3,989,478 A | 11/1976 | Jones |

(Continued)

FOREIGN PATENT DOCUMENTS

| DE | 481875 C | 9/1929 |
| DE | 951875 C | 11/1956 |

(Continued)

OTHER PUBLICATIONS

International Preliminary Report on Patentability issued in PCT Patent Application No. PCT/FR2017/050651 dated Sep. 18, 2018.

*Primary Examiner* — John F Pettitt, III
(74) *Attorney, Agent, or Firm* — Marshall, Gerstein & Borun LLP

(57) ABSTRACT

A process for cryogenic separation of a feed stream containing methane and air gases in which: the feed stream is cooled in order to produce a cooled stream, at least one portion of the cooled stream is sent to one level of a distillation column, a bottom stream is drawn off from the distillation column, the bottom stream being enriched in methane relative to the feed stream, a stream enriched in oxygen and in nitrogen relative to the feed stream is drawn off from the distillation column, at least one noncombustible dilution stream that is more volatile than oxygen is introduced into the distillation column at at least one level lower than the one at which the cooled stream is introduced. The dilution stream is extracted from the feed stream. Facility for (Continued)

producing biomethane by purification of biogases derived from non-hazardous waste storage facilities (NHWSF) implementing the process.

13 Claims, 2 Drawing Sheets

(52) U.S. Cl.
CPC ........ *F25J 2200/38* (2013.01); *F25J 2200/70* (2013.01); *F25J 2205/04* (2013.01); *F25J 2205/60* (2013.01); *F25J 2210/42* (2013.01); *F25J 2210/50* (2013.01); *F25J 2210/60* (2013.01); *F25J 2210/66* (2013.01); *F25J 2215/60* (2013.01); *F25J 2220/40* (2013.01); *F25J 2220/62* (2013.01); *F25J 2220/66* (2013.01); *F25J 2270/904* (2013.01)

(58) Field of Classification Search
CPC .. F25J 2205/02; F25J 2205/04; F25J 2205/60; F25J 2205/64; F25J 2210/42; F25J 2210/60; F25J 2210/66; F25J 2215/60; F25J 2220/40

See application file for complete search history.

(56) References Cited

U.S. PATENT DOCUMENTS

| | | | |
|---|---|---|---|
| 4,617,040 A * | 10/1986 | Yoshino | F25J 3/044 62/656 |
| 6,425,266 B1 * | 7/2002 | Roberts | F25J 3/0209 62/621 |
| 2003/0019241 A1 * | 1/2003 | Oakey | C07C 7/04 62/628 |
| 2004/0103782 A1 | 6/2004 | Wascheck et al. | |
| 2011/0094378 A1 | 4/2011 | Mitariten | |
| 2011/0277500 A1 * | 5/2011 | Bauer | F25J 3/0209 62/630 |
| 2017/0167788 A1 * | 6/2017 | Pierre, Jr. | F25J 3/0209 |
| 2019/0001263 A1 * | 1/2019 | Prince | C10L 3/101 |

FOREIGN PATENT DOCUMENTS

| | | |
|---|---|---|
| FR | 1410494 A | 9/1965 |
| FR | 2917489 A1 | 12/2008 |
| FR | 2971331 A1 | 8/2012 |
| FR | 2971332 A1 | 8/2012 |
| GB | 1482196 A | 8/1977 |

\* cited by examiner

PROCESS FOR CRYOGENIC SEPARATION OF A FEED STREAM CONTAINING METHANE AND AIR GASES, FACILITY FOR PRODUCING BIOMETHANE BY PURIFICATION OF BIOGASES DERIVED FROM NON-HAZARDOUS WASTE STORAGE FACILITIES (NHWSF) IMPLEMENTING THE PROCESS

TECHNOLOGICAL FIELD

The present disclosure relates to a process and device for cryogenic separation of a stream containing methane, carbon dioxide, nitrogen and/or oxygen and more generally air gases, for producing a methane enriched stream.

The disclosed process has a particularly advantageous application in connection with biomethane production by purification of biogas from nonhazardous waste storage facilities (NHWSF).

BACKGROUND

Biogas is a gas produced by a biological process of breakdown of organic matter in an anaerobic environment, that is primarily composed of methane, carbon dioxide, water vapor and impurities in variable quantities depending on the organic material having produced the biogas. The impurities that are mainly found are hydrogen sulfide and when the organic material comes from household or industrial wastes, volatile organic compounds (VOCs).

The biogas can be produced in dedicated reactors (also called "digesters") where the biological reaction operates in a perfectly anaerobic environment and with a controlled temperature. It can also be produced naturally in significant quantities in nonhazardous waste storage facilities (NHWSF), in which household wastes are stored in vaults and covered with a membrane when they are full. After the vault is closed, the process of methane production the organic material can began. The biogas thus produced is then collected by aspiration into a booster via collection tubes inserted in the vaults, thus creating a slightly reduced pressure in said vaults. Since these are not perfectly sealed, air is aspirated and found in the biogas in variable proportion. For this gas source, air gases therefore add to the previously mentioned impurities and must be removed to recover the biogas.

There are also other sources of gas containing methane, carbon dioxide, impurities and a variable concentration of air gases, like gas from mines, produced by degassing of coal seams in abandoned mines, and mixing with air present in the mining spaces. With the goal of recovering this gas for the applications mentioned above, the impurities that it contains must be eliminated.

More specifically, in order to produce a methane enriched stream, it is necessary to remove the carbon dioxide, nitrogen and oxygen impurities to a level such that the methane enriched stream thus produced can be used as natural gas, liquefied natural gas or vehicle fuel. Depending on the uses indicated, the required impurity level can vary. Just the same, a typical target for these impurities in the methane enriched stream is: under 2% by mole carbon dioxide, under 1% oxygen and under 1% nitrogen. When the methane enriched stream no longer contains carbon dioxide, required impurity level is: under 2.5% by mole nitrogen and under 1% oxygen.

The compositions in the remainder of the application are expressed in molar percentages.

In the case of biogas produced by NHWSF, a first treatment is necessary to remove most carbon dioxide and impurities. Many processes exist for that, like the use of gas permeation membranes combined with the treatment of impurities by adsorption (US-2004-0103782), the use of pressure modulated adsorption processes, the use of washing columns with water or amines and the use of cryotrapping processes. The biogas impurities and the majority of the carbon dioxide can be knocked down with these processes, but the air gases cannot be separated from the methane enriched gas stream. An additional treatment step is therefore required.

This additional treatment step can consist of pressure modulated adsorption with the use of specific adsorbents selective for nitrogen and oxygen (U.S. Pat. No. 8,221,524). However, a very low oxygen and nitrogen concentration is achieved at the detriment of the methane recovery rate from the process, which makes it economically uninteresting.

Another solution for removing air gases from methane is cryogenic distillation which can achieve a good separation power between methane on the one hand, recovered at the column bottom and oxygen and nitrogen on the other hand recovered at the column head, because of volatility differences between these components.

However, the presence of oxygen, whose volatility is included between that of methane and nitrogen, leads to this compound tending to concentrate in the distillation zone and to do so even for small oxygen concentrations in the column load. The increase of the gas phase oxygen concentration added to the decrease of the gas phase methane concentration can lead to a gas mixture which is, because of the composition thereof, explosive.

The principle of distillation of the methane and air gases mixture is at cryogenic temperatures known, as is the appearance within the column of potentially explosive gas mixtures. Thus, the document DE 981,875 proposes controlling the distillation in such a way that the gas leaving the column head is outside the upper explosiveness limit (UEL). However, no mention is made of the natural oxygen concentration in the distillation column and therefore the formation of an explosive gas mixture with this process cannot be avoided.

The document FR 1,410,494 identifies the risk of formation of this explosive mixture and proposes a means for avoiding the ignition of the mixture by placing a metal foam between the levels the distillation column with which to dissipate the methane oxidation reaction heat and therefore avoid an explosion. However, the means proposed do not avoid the methane oxidation reaction which will produce carbon dioxide and water, these are undesirable compounds because they could block the column at cryogenic temperatures.

The document U.S. Pat. No. 3,989,478 proposes to adjust the distillation such that the gas leaving the column head contains at least 20% methane, such that the composition of the gas phases in the distillation zone are not explosive. The disadvantage of such an adjustment is both that if the column head gas contains 20% methane, and the remainder air, it is extremely close to explosiveness. Also, the loss of methane in the head gas is significant. Finally, no mention is made of the natural oxygen concentration in the distillation column and therefore the formation of an explosive gas mixture with this process cannot be avoided.

Another solution would be to dilute the gas and/or liquid mixtures from the distillation column such that this concentration is returned to a value making the mixture nonexplosive in the areas having an enrichment of the oxygen concentration.

Thus the document FR 2,971,331 proposes a dilution by pumping liquid methane in the distillation column bottom and reinjection thereof in the column head. Although the means proposed avoids formation of an explosive mixture in the column, it leads to increasing the inventories of liquid methane in the column, and therefore the stored energy, which is not desirable from the process safety perspective. Also a liquid methane pump has to be installed which is a source of potentially dangerous leaks.

The document FR 2,971,332 proposes avoiding the formation of an explosive mixture within the column by dilution with nitrogen taken from an external source. It is therefore necessary to use a fluid, nitrogen, for the dilution. The fluid has a cost and therefore increases the operating costs for the process. It should be noted that in this document, the methane in the gas state injected in the column bottom is a combustible stream coming from the condenser-re-boiler. It is used exclusively as a rising gas phase in connection with the distillation of the feed stream. Without such a stream, distillation is not possible.

The document U.S. Pat. No. 2,519,955 describes a production process for a methane and oxygen mixture. The idea is not to separate the methane from the oxygen to reduce the explosion risk but instead to combine them. Essentially, the process consists of decompressing a biological gas stream rich in methane but depleted of oxygen and then to recover the heat produced within an exchanger placed in a distillation column. Within the exchanger, a portion of the feed stream composed of liquid methane is reinjected in the column bottom whereas the other part composed of nitrogen is reinjected in the column head at a level higher than that of the feed stream. The nitrogen stream is therefore not used as dilution stream but serves to limit the loss of methane by occupying the column head volume.

Further, in order to be able to perform the separation of $O_2$ and $N_2$ relative to $CH_4$ by cryogenic distillation, it is necessary to have a stream whose $CO_2$ concentration is particularly low. The commonly accepted value is 50 ppmv—parts per million by volume—of carbon dioxide maximum to avoid crystal formation which would plug the cryogenic exchangers. Similarly, water must be eliminated to avoid freezing.

To resolve that problem, the document FR 2,917,489 proposed regenerating the adsorbents used in the temperature or pressure modulated adsorbers by means of methane enriched gas, collected at the foot of the distillation column in the liquid state and next vaporized. The disadvantage of the use of this fluid for regeneration resides in the need to control the quantity of carbon dioxide to a constant value at the outlet of the adsorbent bed, by mixing the bed outlet stream with a methane enriched stream. This control is made necessary because the methane enriched stream containing a small quantity of carbon dioxide coming from the regeneration is intended to be used in biomethane form. However, in order to be injected in the natural gas network, it must strictly satisfy the quality requirements of the network operator.

SUMMARY OF THE DISCLOSURE

The present disclosure addresses the problem of improving a process for cryogenic separation of the mixture for which the concentrations are always outside the explosiveness zone and that does not have the disadvantages raised above.

The present disclosure also addresses the problem of regenerating the adsorbents used in the temperature or pressure modulated adsorbers from a stream coming from the cryogenic separation without leading to the aforementioned drawbacks.

To resolve these problems and others, the Applicant developed a cryogenic separation process in which the $O_2$ dilution stream consists essentially of nitrogen and comes from the feed stream and not an external source. An obvious cost reduction results.

More precisely, the object of the present disclosure is a cryogenic separation process for a feed stream containing methane and air gases wherein:
  the feed stream is cooled to produce a cooled stream;
  at least a portion of the cooled stream is sent to a level of a distillation column;
  a bottom stream is drawn off from the distillation column, where the bottom stream is enriched in methane compared to the feed stream;
  a stream enriched in oxygen and nitrogen compared to the feed stream is drawn off from the distillation column;
  at least one dilution stream that is incombustible and more volatile than oxygen (meaning a stream containing essentially nitrogen) is added to the distillation column at least one level below the level at which the cooled stream is added.

The process characterized in that the dilution stream is extracted from the feed stream.

In a preferred embodiment:
  the cooled stream is at least partially condensed;
  the at least partially condensed cooled stream is then decompressed;
  the dilution stream is produced by separation of the gas fraction produced at the outlet of the decompression.

In practice, the feed stream contains 60 to 97% methane, between 3 and 50% nitrogen and oxygen and 3% or less carbon dioxide.

The Applicant showed that the prior decompression of the feed stream for the distillation column in a round-bottom separator, and then injection of the gas phase comprising essentially nitrogen, thus produced, in the low part of the packing of the distillation column, meaning upstream from the gas stream, would lead to a sufficient dilution of the gaseous oxygen, whose concentrations, because of this sweeping flow, are sufficiently low that the mixture with methane is not inflammable. The liquid fraction of the feed stream comprising essentially liquid methane is for its part next injected in the head of the column to be distilled.

Because of the separation of the gas phase from the liquid phase of the feed stream and the reinjection of all or part of this gas phase, it is not necessary to use gaseous nitrogen coming from an outside source as sweeping fluid, such that the nitrogen consumption decreases.

Just the same, the use of a gas coming from the feed stream to be treated itself as a dilution stream, whether it comes from decompressing the cooled stream or at the end of another treatment step thereof, does not exclude combining it with a dilution stream coming from an external source. The two dilution streams can be added to the distillation column in the form of one single mixture or separately.

In practice, it is necessary to cool the column head to condense the rising nitrogen rich gas in said column head and as necessary a portion of the gas coming from the feed stream from the separator.

In a first embodiment, the column head is cooled by cooling the feed stream coming from the decompression by mixing it with a refrigerant fluid. In other words, the refrigerant fluid stream is used as a cold source for condensation of the column head gas and participates in the effect of dilution of the oxygen in the distillation column by providing the condensation of only a portion of the gas coming from the decompression of the feed stream, the other part constituting the dilution stream.

The feed stream is cooled either before the separator by mixing said stream with the refrigerant fluid or in the separator by adding a refrigerant fluid directly into the separator.

In a second embodiment, the column head is cooled by means of a refrigerant fluid that is added directly to the column head.

In practice, the refrigerant fluid is liquid nitrogen.

In a specific embodiment, the column contains several distillation segments and the dilution feed is introduced between two segments.

In practice, the distillation segments are in the form of packing or distillation plateau. In all cases, the distillation segments are arranged so that the liquid phase releases the most volatile compounds thereof to the gas phase and the gas phase releases the least volatile compounds thereof to the liquid phase.

As already stated, the process has a particularly advantageous application in connection with biomethane production by purification of biogas from NHWS.

In order to be able to perform the separation of $O_2$ and $N_2$ relative to $CH_4$ by cryogenic distillation, it is necessary to have a stream whose $CO_2$ concentration is particularly low. The commonly accepted value is 50 ppmv—parts per million by volume—of carbon dioxide maximum to avoid crystal formation which would plug the cryogenic exchangers. Similarly, water must be eliminated for the same reason.

In other words, and, prior to the cryogenic separation, a feed stream is provided that is rich in methane, contains nitrogen and oxygen, and has a $CO_2$ concentration that was previously reduced.

To do that, the $CO_2$ concentration is reduced by adding the $CO_2$ rich feed stream into at least one purification unit, preferably by adsorption, for example pressure (PSA) or temperature (PTSA) modulated, loaded with adsorbent able to reversibly adsorb the majority of the $CO_2$.

This type of purifier is known to the person skilled in the art. In practice, for continuous operation at least two PSA or PTSA are used in parallel with one being in adsorption for eliminating the carbon dioxide while the other is in regeneration. Regeneration is done by lowering the pressure and by sweeping with the previously heated gas supplying the energy required for desorption.

In a first embodiment, the adsorbents used in the adsorbers are regenerated by means of the oxygen and nitrogen-rich gas stream drawn from the column head. In practice, the methane depleted stream drawn from the column head contains between 60 and 100% nitrogen and oxygen.

It was in fact found that the column head gas, methane depleted, and also containing nitrogen gas injected in the column, had a sufficient flow rate, because of the nitrogen injection, to perform the heating and cooling cycle of the adsorbent sieve, necessary for the carbon dioxide desorption, to be done during the regeneration time. In this case, it is no longer necessary to use the methane stream withdrawn from the column bottom to regenerate the adsorbents and therefore to maintain a constant carbon dioxide concentration in the bed outlet stream. It is thus possible to withdraw the methane enriched stream in liquid form and make use of it as liquefied natural gas.

In practice, the methane enriched stream at column bottom contains between 95 and 100% methane.

The $CO_2$ loaded gas coming from regeneration can then be used in two different ways: either the loaded gases sent to a system for destruction by oxygen, or, if the methane concentration is sufficient, the loaded gases sent to a combustion system for electricity production (cogeneration micro-turbine or engine).

In a second embodiment, the adsorbents used in the adsorbers are regenerated by means of methane-rich gas drawn from the column bottom.

Another subject of the disclosure is a facility for producing biomethane by purifying biogas from non-hazardous waste storage facilities (NHWSF) implementing the process described above and comprises successively:
  a unit for purification of carbon dioxide by adsorption able to deplete the feed stream of carbon dioxide;
  a heat exchanger able to cool the $CO_2$ depleted stream;
  a condenser-reboiler able to condense the $CO_2$ depleted stream by heat exchange with the liquid drawn off the column bottom;
  a means for decompression of the condensed stream;
  a round bottom separator for the liquid and gas phases from the condensed stream;
  a distillation column;
  a conduit able to transport the liquid phase from the round-bottom separator to a level of a distillation column;
  a conduit able to transport the gas phase (dilution stream) from the round-bottom separator into the column at least one level lower than the level at which the liquid phase is added;
  means connected to a refrigerant fluid source for sending the liquid nitrogen stream to the point for mixing with the feed stream, or directly into the round-bottom separator.

The Facility Further Comprises:
  means for withdrawing a methane enriched liquid stream from the bottom of the column for sending it into the condenser-reboiler and producing a methane enriched gas stream;
  means for returning the methane enriched gas stream to the column bottom;
  means for collecting the methane depleted gas stream from the column head and sending it to the heat exchanger;
  means for collecting the methane enriched gas stream from the column bottom and sending it to the heat exchanger;
  means for collecting the methane depleted stream reheated in the exchanger, or the methane enriched stream reheated in the exchanger, to the purification unit.

BRIEF DESCRIPTION OF THE DRAWINGS

The disclosed process and facility and resulting benefits will become clear from the following examples supported by the attached figures.

DETAILED DESCRIPTION

Figure 1:
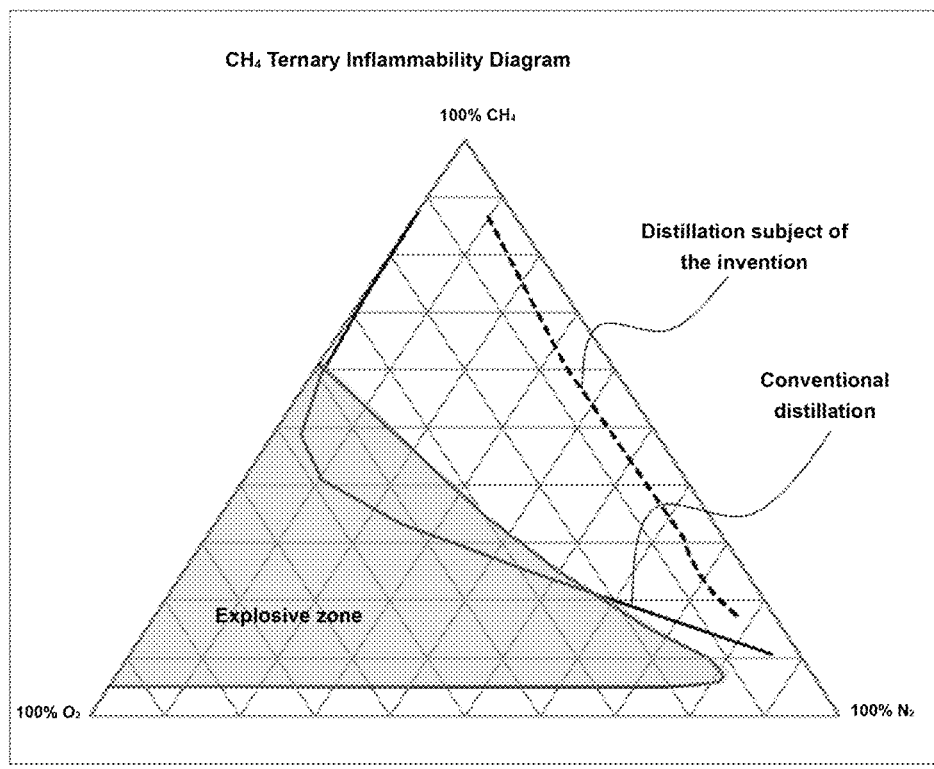
FIG. 1 shows the explosiveness diagram of a methane, oxygen and nitrogen mixture.

The explosiveness diagram for a methane, oxygen and nitrogen mixture is shown in FIG. 1. In this diagram, the explosiveness zone is grayed. The composition of the gas phase over the entire height of the column is shown with a dashed line for the case where the round bottom separator is not installed; the vapor phase then crosses into the explosiveness zone. In the scenario where a round bottom phase separator is installed, and where the gas phase produced is used to sweep the packing, then the gas phase rising in the column is not explosive.

Figure 2:
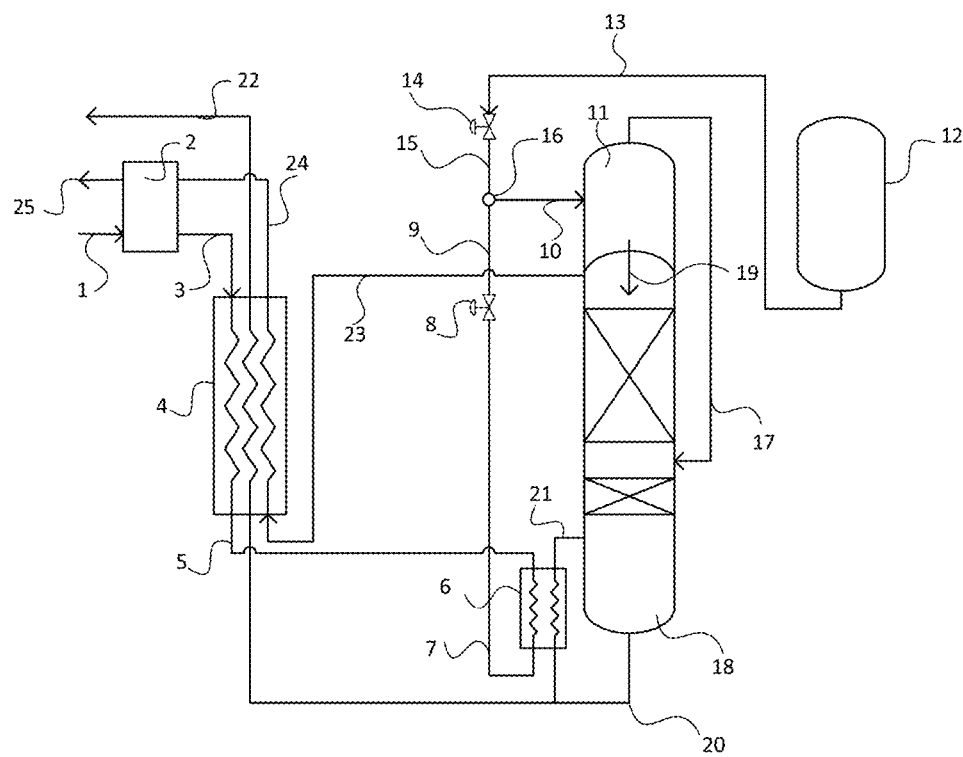
FIGS. 2 to 4 are diagrams of a cryogenic separation unit integrated into a facility (partially shown) for production of biomethane by purification of biogas coming from nonhazardous waste storage (NHWS). The drawings differ in the final use of the streams after cryogenic separation.
Figure 3:
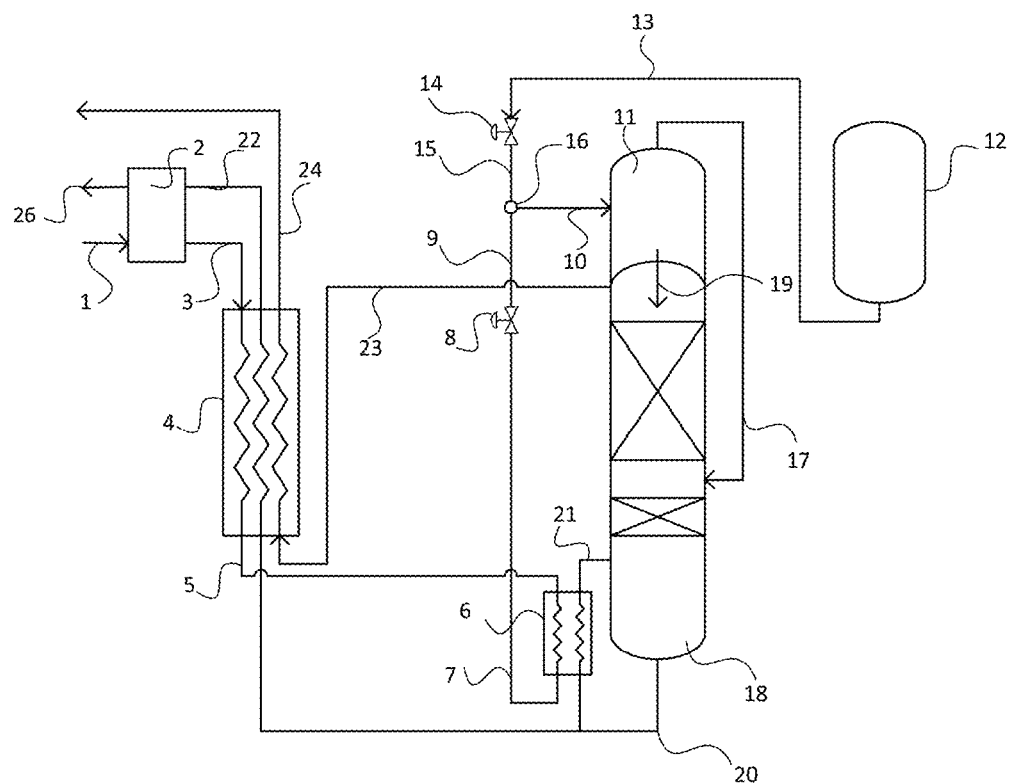
Figure 4:
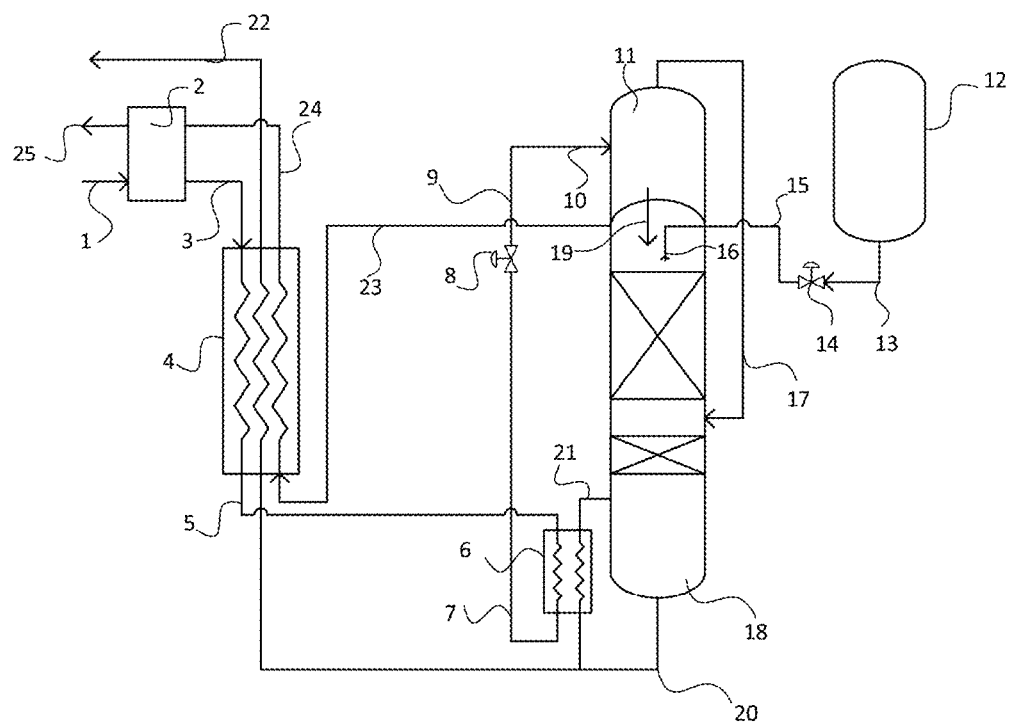

For each of FIGS. 2 to 4, a feed gas stream (1), at a pressure included between 5 and 15 bar absolute, comprising between 60 and 97% methane, between 3 and 50% nitrogen and oxygen, and 3% or less carbon dioxide is added into the unit for purification by adsorption (2), advantageously a PTSA, in order to lower the water and carbon dioxide concentration to a value less than or equal to 50 ppmv.

The stream thus produced (3) is then cooled in a heat exchanger (4) by exchanging heat with the methane enriched liquid stream (20) and the methane depleted stream (23). The cooled stream (5) is sent into a reboiler condenser (6) where it is cooled again by heat exchange with the bottom liquid, so that the bottom liquid can boil and generate methane-rich gas which will be used in the distillation, and also to condense the feed stream.

The condensed stream (7) is then decompressed in a decompression member (8) to the operating pressure of the column (18), included between 1 and 5 bar absolute.

According to FIGS. 2 and 3, a liquid nitrogen stream (13) coming from liquid nitrogen storage (12) is decompressed in a decompression member (14) and the decompressed stream (15) is mixed with the feed stream (9), at point 16, to next be introduced in a round bottom container for separation of liquid and gas phases (11). In an embodiment not shown, the liquid nitrogen is injected directly in the round-bottom separator.

The embodiment differs from the one shown in FIG. 4 in that the liquid nitrogen is injected directly in the upper part of the distillation column, by means, for example, of an injection nozzle (16).

For all embodiments, the liquid nitrogen rich liquid phase (19) coming from the round-bottom separator (11) is next added into the upper part of the distillation column (18). The gas phase (17) is added into the lower part of the packing of the distillation column (18) to constitute the sweeping gas and participate in the distillation.

Distillation thus produces two streams: a methane enriched stream (20), bottom of the distillation column, and a methane depleted stream (23) that is rich in $O_2$ and $N_2$ at the head of the distillation column.

A fraction of the methane enriched liquid stream (20) is sent to the exchanger (4) to be vaporized and form a gaseous stream (22). This gaseous stream can be used in two ways.

As shown in FIG. 2, this gaseous stream (22) is used as is. It is sent for injection into the natural gas network via an injection station, or to a compression station to produce compressed natural gas, for use in a vehicle natural gas, for example.

As shown in FIG. 3, this gaseous stream (22) is used to regenerate the purification unit (2) and form a methane enriched stream (26) containing carbon dioxide coming from regeneration of the purification unit. The stream (26) is next sent to a compression station to produce compressed natural gas, for use in a natural gas vehicle, for example.

In an embodiment not shown, the methane enriched stream (20) is drawn off in a liquid form and used as liquefied natural gas.

For all embodiments, the other fraction of the methane enriched liquid stream in column bottom is sent to the reboiler condenser (6) to be vaporized. The gas stream thus created (21) is sent to the distillation column to create the rising vapor participating in the distillation.

The gas stream (23) comprising oxygen, nitrogen and a methane fraction is then sent to the exchanger (4) to be reheated.

In the embodiment shown in FIG. 2, the stream (24) leaving the exchanger is used to regenerate the purification unit (2) and produce the stream (25), which is then treated for burning the residual methane in an oxidizer.

If the methane concentration is over 25%, the stream (25) can be used in a cogeneration engine or micro-turbine in order to produce electricity.

In the embodiment shown in FIG. 3, the stream (25) is sent directly to the methane oxidation or usage systems mentioned above.

The invention claimed is:
1. A cryogenic separation process for a feed stream containing methane and air gases comprising nitrogen and oxygen wherein:
   the feed stream is cooled to produce a cooled stream comprising methane, nitrogen, and oxygen, wherein the feed stream is at a pressure of 5 to 15 bar absolute when cooled;
   the cooled stream is at least partially condensed;
   the at least partially condensed cooled stream is decompressed to produce a decompressed stream, said decompressed stream producing a gaseous phase and a liquid phase and said decompressed stream having a pressure of 1 to 5 bar absolute;
   the gaseous phase and the liquid phase are separated;
   the liquid phase is injected into a level of a distillation column;
   a bottom stream is drawn off from the distillation column, where the bottom stream is enriched in methane compared to the feed stream;
   a stream, which is enriched in oxygen and nitrogen compared to the feed stream is drawn off from the distillation column, wherein:
   the gaseous phase, which consists essentially of $N_2$ and which is incombustible and more volatile than oxygen, is added to the distillation column at least one level below the level at which the liquid phase is added, and wherein:
   the cooled stream is at least partially condensed by heat exchange with a fraction of the bottom stream which further cools the cooled stream resulting in the cooled stream being at least partially condensed and the fraction of the bottom stream being boiled to produce a methane-rich gas which is then fed into the distillation column,
   the gaseous phase that consists essentially of $N_2$ is added to the distillation column above where the methane rich gas is fed into the distillation column, and
   the decompressed stream is mixed with a refrigerant fluid before the gaseous phase and the liquid phase are separated.

2. The process according to claim 1, wherein the distillation column contains several distillation segments and the gaseous phase is added between two segments.

3. The process according to claim 1, wherein a $CO_2$ concentration of the feed stream is reduced by adsorption using at least one purification unit loaded with adsorbent able to reversibly adsorb $CO_2$ before the feed stream is cooled.

4. The process according to claim 3, wherein the purification unit is a unit for purification by adsorption of PSA or PTSA and wherein the PSA or PTSA is regenerated by means of the oxygen and nitrogen-enriched gas stream drawn from a column head of the distillation column.

5. The method of claim 1, wherein the distillation column comprises two or more distillation segments, and the gaseous phase that consists essentially of $N_2$ is added to the distillation column such that at least one of the two or more distillation segments is interposed between the gaseous phase and the methane rich gas.

6. The method of claim 5, wherein the gaseous phase that consists essentially of $N_2$ is added between at least two of the two or more distillation segments.

7. The method of claim 5, wherein the liquid phase is introduced above of each of the two or more distillation segments, the gaseous phase consisting essentially of $N_2$ is added between distillation segments of the two or more distillation segments, and the methane-rich gas is added below the two or more distillation segments.

8. The method of claim 1, wherein the gaseous phase that consists essentially of $N_2$ is added such that a gaseous mixture resulting within the distillation column has an oxygen concentration below about 12%.

9. A cryogenic separation process for a feed stream containing methane and air gases comprising nitrogen and oxygen, comprising:
cooling the feed stream to produce a cooled stream comprising methane, nitrogen, and oxygen;
at least partially condensing the cooled stream by heat exchange;
decompressing the at least partially condensed cooled stream to produce a decompressed stream comprising a gaseous phase and a liquid phase, wherein the gaseous phase consists essentially of $N_2$;
separating the gaseous phase from the liquid phase;
injecting the liquid phase into a distillation column at a first level;
adding the gaseous phase into the distillation column at a second level;
drawing a bottom stream off of the distillation column, where the bottom stream is enriched in methane compared to the feed stream; and
drawing off a stream which is enriched in oxygen and nitrogen compared to the feed stream off of the distillation column, wherein:
the distillation column comprises two or more distillation segments, the gaseous phase that consists essentially of $N_2$ is incombustible and more volatile than oxygen, and is added into the distillation column,
the cooled stream is at least partially condensed by heat exchange with a fraction of the bottom stream which further cools the cooled stream resulting in the cooled stream being at least partially condensed and the fraction of the bottom stream being boiled to produce a methane-rich gas which is then added into the distillation column at a third level,
the second level, at which the gaseous phase is added to the distillation column, is below the first level, at which the liquid phase is injected into the distillation column, and above the third level, at which the methane rich gas is added into the distillation column,
at least one of the two or more distillation segments is interposed between the second and third levels, and
the decompressed stream is mixed with a refrigerant fluid before the gaseous phase and the liquid phase are separated.

10. The method of claim 9, wherein the second level is positioned between adjacent ones of the two or more distillation segments.

11. The method of claim 10, wherein the third level is positioned below of the two or more distillation segments.

12. The method of claim 11, wherein the first level is positioned above of the two or more distillation segments.

13. The method of claim 9, wherein the gaseous phase that consists essentially of $N_2$ is added such that a gaseous mixture resulting within the distillation column has an oxygen concentration below about 12%.

* * * * *